United States Patent
Papakipos et al.

(10) Patent No.: US 8,706,499 B2
(45) Date of Patent: Apr. 22, 2014

(54) PERIODIC AMBIENT WAVEFORM ANALYSIS FOR ENHANCED SOCIAL FUNCTIONS

(75) Inventors: Matthew Nicholas Papakipos, Palo Alto, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 157 days.

(21) Appl. No.: 13/211,182

(22) Filed: Aug. 16, 2011

(65) Prior Publication Data
US 2013/0046542 A1 Feb. 21, 2013

(51) Int. Cl.
| | | |
|---|---|---|
| G10L 15/00 | (2013.01) | |
| G10L 17/00 | (2013.01) | |
| G10L 15/26 | (2006.01) | |
| G10L 21/00 | (2013.01) | |
| G01L 25/00 | (2006.01) | |
| G06F 11/30 | (2006.01) | |
| G06F 7/00 | (2006.01) | |
| G06F 17/30 | (2006.01) | |
| G06F 3/00 | (2006.01) | |

(52) U.S. Cl.
USPC ........... 704/270; 704/243; 704/246; 704/235; 704/236; 704/275; 704/249; 704/273; 701/410; 701/469; 701/31.5; 701/455; 707/751; 707/724; 707/748; 707/769; 707/770; 707/722; 707/739; 715/745

(58) Field of Classification Search
USPC ......... 704/243, 249, 273, 235–236, 275, 246; 707/751, 748, 724, 769–770, 722, 739; 701/410, 469, 31.5, 455; 715/745
See application file for complete search history.

(56) References Cited

U.S. PATENT DOCUMENTS

| | | | |
|---|---|---|---|
| 6,012,027 A * | 1/2000 | Bossemeyer, Jr. | 704/243 |
| 6,201,176 B1 * | 3/2001 | Yourlo | 84/609 |
| 7,295,970 B1 * | 11/2007 | Gorin et al. | 704/221 |
| 7,590,232 B2 * | 9/2009 | Carter et al. | 379/209.01 |
| 8,117,193 B2 * | 2/2012 | Svendsen et al. | 707/722 |
| 8,150,844 B2 * | 4/2012 | Redstone et al. | 707/724 |
| 8,255,393 B1 * | 8/2012 | Yu et al. | 707/724 |
| 8,315,800 B2 * | 11/2012 | Sanchez et al. | 701/516 |
| 8,326,624 B2 * | 12/2012 | Jaiswal | 704/246 |
| 8,457,964 B2 * | 6/2013 | Jaiswal | 704/246 |
| 8,527,279 B2 * | 9/2013 | Singleton et al. | 704/275 |
| 8,538,753 B2 * | 9/2013 | Krishnaswamy et al. | 704/235 |
| 8,542,803 B2 * | 9/2013 | Abella et al. | 379/88.13 |
| 2003/0050777 A1 * | 3/2003 | Walker, Jr. | 704/235 |
| 2005/0050201 A1 * | 3/2005 | Parupudi et al. | 709/226 |
| 2007/0280436 A1 * | 12/2007 | Rajakumar | 379/88.02 |
| 2008/0057911 A1 * | 3/2008 | Lauper | 455/412.1 |
| 2009/0105950 A1 * | 4/2009 | Arteaga et al. | 701/213 |

(Continued)

*Primary Examiner* — Pierre-Louis Desir
*Assistant Examiner* — Anne Thomas-Homescu
(74) *Attorney, Agent, or Firm* — Baker Botts L.L.P.

(57) ABSTRACT

Client devices periodically capture ambient audio waveforms, generate waveform fingerprints, and upload the fingerprints to a server for analysis. The server compares the waveforms to a database of stored waveform fingerprints, and upon finding a match, pushes content or other information to the client device. The fingerprints in the database may be uploaded by other users, and compared to the received client waveform fingerprint based on common location or other social factors. Thus a client's location may be enhanced if the location of users whose fingerprints match the client's is known. In particular embodiments, the server may instruct clients whose fingerprints partially match to capture waveform data at a particular time and duration for further analysis and increased match confidence.

18 Claims, 8 Drawing Sheets

(56) References Cited

U.S. PATENT DOCUMENTS

| | | | |
|---|---|---|---|
| 2009/0144392 A1* | 6/2009 | Wang et al. | 709/217 |
| 2009/0198666 A1* | 8/2009 | Winston et al. | 707/5 |
| 2010/0049852 A1* | 2/2010 | Whitnah et al. | 709/226 |
| 2010/0063815 A1* | 3/2010 | Cloran et al. | 704/235 |
| 2011/0054899 A1* | 3/2011 | Phillips et al. | 704/235 |
| 2011/0066433 A1* | 3/2011 | Ljolje et al. | 704/236 |
| 2011/0072020 A1* | 3/2011 | Ngo et al. | 707/739 |
| 2011/0093197 A1* | 4/2011 | Bowman et al. | 701/212 |
| 2011/0221671 A1* | 9/2011 | King et al. | 345/156 |
| 2012/0066035 A1* | 3/2012 | Stanger et al. | 705/14.1 |
| 2012/0232898 A1* | 9/2012 | Di Fabbrizio et al. | 704/235 |
| 2012/0253811 A1* | 10/2012 | Breslin et al. | 704/249 |
| 2013/0013306 A1* | 1/2013 | Zimmerman et al. | 704/235 |
| 2013/0024473 A1* | 1/2013 | Krishnan et al. | 707/769 |
| 2013/0080447 A1* | 3/2013 | Ramer et al. | 707/748 |
| 2013/0166200 A1* | 6/2013 | Dhanani et al. | 701/465 |
| 2013/0190967 A1* | 7/2013 | Hassib et al. | 701/31.5 |
| 2013/0289985 A1* | 10/2013 | Williams et al. | 704/235 |

\* cited by examiner

PERIODIC AMBIENT WAVEFORM ANALYSIS FOR ENHANCED SOCIAL FUNCTIONS

TECHNICAL FIELD

This disclosure generally relates to periodically capturing waveform data using the sensor subsystem of a mobile device and generating a fingerprint of the waveform for analysis on a server for enhanced social functions.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to a geo-social networking system that includes features directed to automatically and periodically capturing waveform data from the sensor subsystem of a mobile device, uploading a representation of the waveform data to a server for analysis, and receiving content based on the analysis. These and other features, aspects, and advantages of the disclosure are described in more detail below in the detailed description and in conjunction with the following figures.

DESCRIPTION OF EXAMPLE EMBODIMENTS

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/863,181, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/584,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,817, incorporated by reference in its entirety for all purposes, describes an example geo-social networking system that can be used in connection with various embodiments of the present invention. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

Still further, particular embodiments allow the social networking system to receive waveform fingerprints from a client or mobile device, and perform analysis on the waveform fingerprints to provide enhanced social functions to the user of the device. In particular embodiments, the determined location of the client device may be enhanced through waveform analysis. For example, if a user is in a particular venue, the waveform fingerprints captured by his mobile device will match the waveform fingerprints uploaded by other users. If any of the other users' locations converge, or if one of the users makes an explicit on-network statement that he or she is at the venue, either through a check-in operation or a comment, the social networking system may update and enhance the user's inaccurately determined position.

In particular embodiments, received waveform fingerprints may be matched to a database of waveforms for pushing suggestions, advertisements, and other content to users. For example, if a user is in a particular location and the waveform fingerprint uploaded by his or her mobile device matches the fingerprint of a particular song stored in an audio database, the social networking system may ask the user if he or she would like to purchase the song for download, may suggest similar songs/artists to the user, or target the user for marketing based on his musical taste. In particular embodiments, the detected song may be posted to the wall of the user as a "currently listening to" story or widget.

In particular embodiments, received waveform fingerprints matching the fingerprint of an object in the audio store may be substituted for explicit graph connections. For example, if three of a user's friends capture and upload waveforms matching a particular television program or movie, the social networking system may infer a connection from those three users to the matched program, and suggest the matched program to the user. In particular embodiments, the social networking system may prompt the user to submit a review for the identified content. In particular embodiments, the server may classify matches as high or low confidence, and in the case of a low confidence match, transmit a command to the client devices generating the partially patching waveform fingerprints to capture ambient audio data at a specific time and duration for retransmission and analysis to the server. Thus, the server may determine whether particular waveforms match to a high degree of confidence. This disclosure provides a method of capturing the ambient sounds around a user for enhanced social functions.

Figure 1:
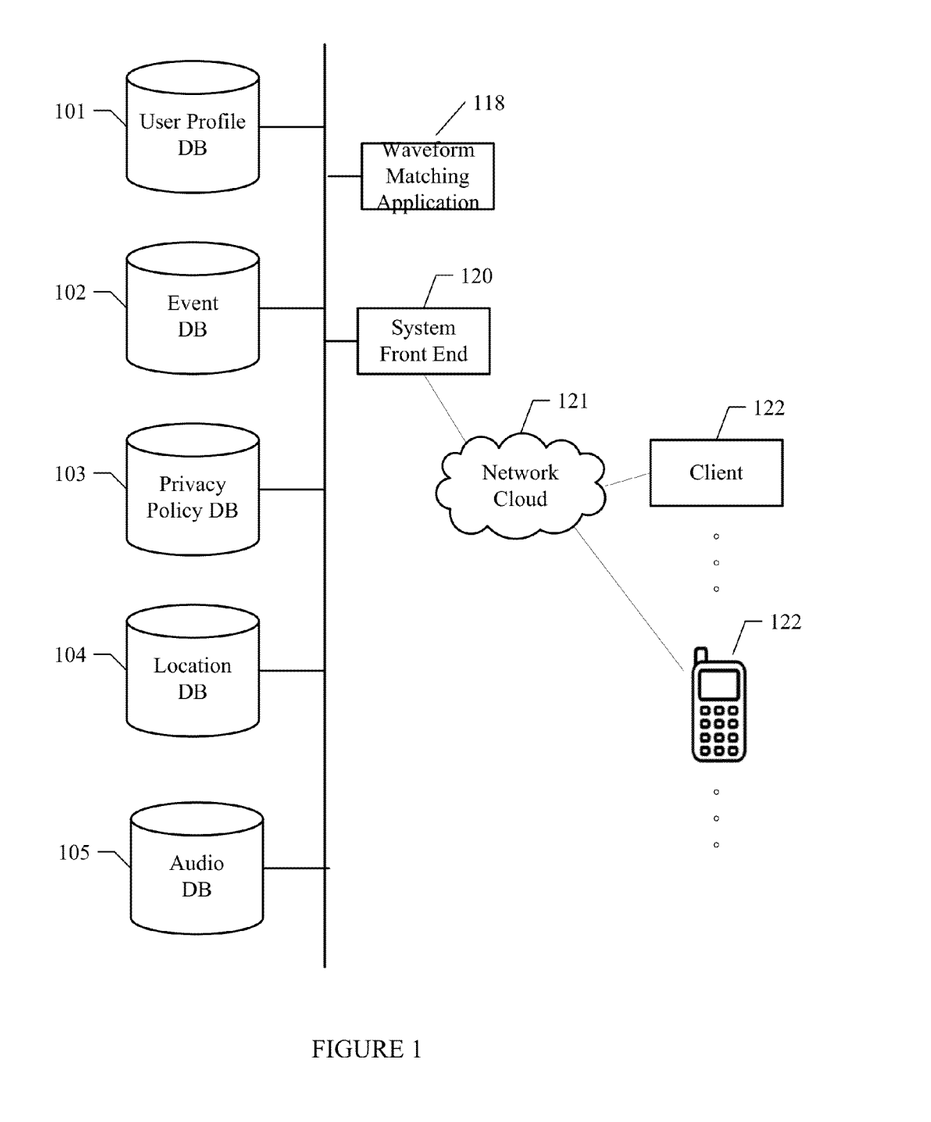
FIG. 1 illustrates an example social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, social networking system may store audio waveforms or audio waveform fingerprints for various songs, tv shows, soundtracks, movies, performances, and the like in audio database 105. In particular embodiments, databases 101, 102, 103, 104, and 105 may be operably connected to the social networking system's front end. In particular embodiments, social networking system also includes waveform matching application 118, that matches uploaded waveform fingerprints with waveforms or waveform fingerprints stored in audio database 105.

In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device. In particular embodiments, the social networking system may calculate one or more routes of a user based on the user's user profile information, check-in activities, and/or geographic location data reported by a client application (see above) and store the one or more routes in location database 104. For example, the social networking system can calculate a "commute route" of a user between the user's home and work (as described in the user's user profile information stored in user profile database 101) by using a mapping service application such as Google Map, or by using geographic location data points from the user's GPS-equipped mobile phone while the user is driving to work.

Waveform matching application 118 matches waveforms or waveform fingerprints uploaded by client devices 122 to waveforms or waveform fingerprints in audio database 105. In particular embodiments, waveform matching application utilizes feature detection using Fast Fourier Transforms (FFTs) or Direct Cosine Transforms (DCTs). In particular embodiments, cross correlation in either the frequency or time domain is utilized for waveform matching. In particular embodiments, dynamic waveform matching (DWM) may be utilized to shift the waveforms on the time axis. In particular embodiments, waveform matching application 118 utilizes audio fingerprinting of the waveform files in audio database 105. This disclosure contemplates any suitable method or algorithm for waveform or waveform fingerprint matching.

Figure 2:
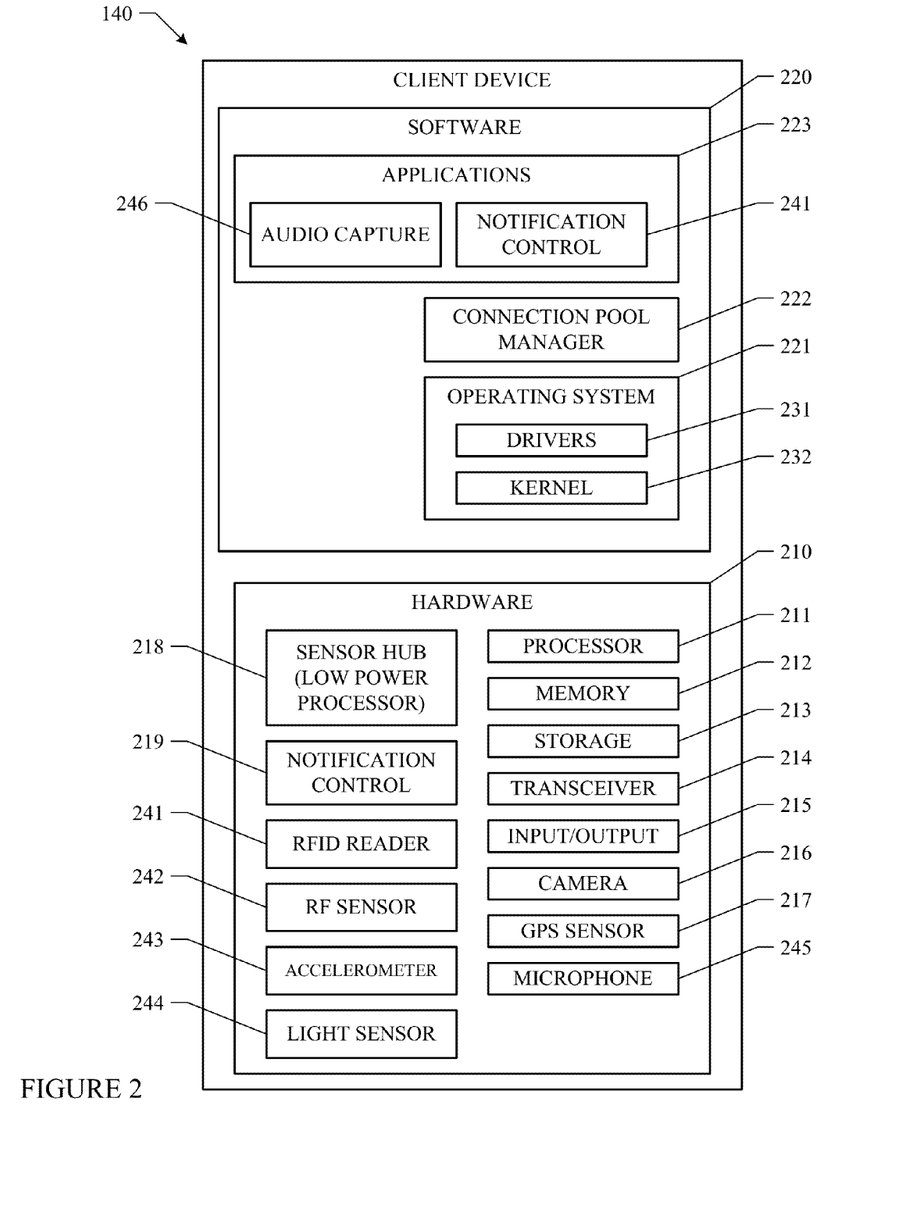
FIG. 2 illustrates an example user device.

FIG. 2 illustrates an example client device 122. In particular embodiments, client device 122 may be a smart phone (e.g., iPhone or Blackberry), which is a mobile telephone that offers more advanced computing ability and connectivity than a traditional mobile phone. It may be considered as a handheld computer integrated with a mobile phone. In particular embodiments, client device 122 may be a netbook or tablet computer (e.g., iPad). In particular embodiments, client device 122 may be connected to a network through a wireless connection.

In particular embodiments, client device 122 may include hardware 210 and software 220. In particular embodiments, hardware 210 may include any number of hardware components such as, for example and without limitation, processor 211, memory 212, storage 213, transceiver 214, input/output device 215 (e.g., display, touch screen, keypad, microphone, speaker, etc.), camera 216, global positioning system (GPS) sensor 217, sensors hub 218, notification control switch 219, RFID reader 241, RF sensor 242, accelerometer 243, light sensor 244, microphone 245 (which may be part of input/output block 215) and so on. This disclosure contemplates any suitable hardware components. In particular embodiments, some or all of a user's user data may be stored in storage 213.

In particular embodiments, software 220 may include an operating system 221, which may include a kernel 231 and/or any number of device drivers 232 corresponding to some of the hardware components available on client device 122. Operating system 221 may be selected for client device 122 based on the actual type of device client device 122 is. For example, if client device 122 is a mobile device (e.g., a smart phone), then operating system 221 may be a mobile operating system such as, for example and without limitation, Microsoft's Windows Mobile, Google's Android, Nokia's Symbian, Apple's iOS, and Samsung's Bada.

In particular embodiments, one or more software applications 223 may be executed on client device 122. In particular embodiments, they may be native applications installed and residing on client device 122. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 216; a fifth application may allow the device user to receive and initiate VoIP and/or cellular network calls, and so on. In particular embodiments, there may be a software application (e.g., notification control 241) that enables the device user to manage the notifications pushed to client device 122. Each software application 220 may have a user interface and may implement one or more specific functionalities. Each software application 220 may include one or more software modules implementing the individual functionalities. The executable code of software applications 220 may be stored in a computer-readable and non-transitory medium (e.g., storage 213 or memory 212) on client device 122. In particular embodiments, non-native, web-based applications interact with the hardware of client device 122 through various application program interfaces (APIs) to allow use of the microphone and other subsystems of client device 122. For example, a web application or plug-in at www.google.com/voice may permit the user to utilize the microphone subsystem of client device 122 to make VoIP calls directly from the web browser residing on client device 122.

Audio capture application 246 is operably connected to microphone 245 and sensor hub 218. In particular embodiments, audio capture application 246 continuously captures audio data and converts it into a waveform fingerprint, using audio feature detection algorithms (FFT/DCT/etc.). In particular embodiments, audio capture application 246 only periodically captures waveform data and converts the data into waveform fingerprints. In particular embodiments, sensor hub 218 captures and stores waveform data via microphone 245 and stores the waveforms in storage 213 for later fingerprint generation by audio capture application 245. In particular embodiments, audio capture application 246 runs only when the user changes location. In particular embodiments, audio capture application 246 runs only when the detected sound level exceeds a predetermined number of decibels. This disclosure contemplates any suitable manner of capturing ambient audio data.

Figure 3:
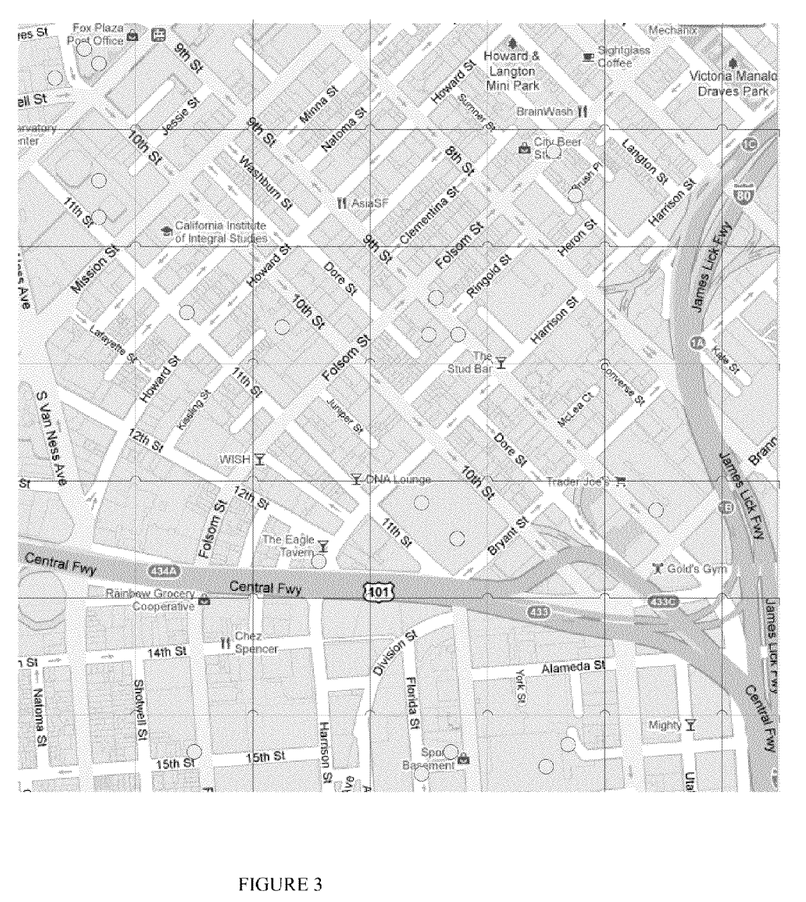
FIG. 3 illustrates an example geographic area and the self-reported location of users in the geographic area.

FIG. 3 illustrates an example geographic area 300 and the self-reported location of various users 301 of the social networking system on the map. In particular embodiments, the self-reported location is calculated by a GPS receiver chip in client devices 122. In particular embodiments, the location is calculated by TDOA or other position determination algorithms. In particular embodiments, geographic area may be segmented into various quadrants, and user waveform fingerprints may be searched against waveform fingerprints uploaded by other users in the same quadrant. In particular embodiments, the search area is based on the amplitude or absolute volume of the uploaded fingerprint. For example, if an uploaded fingerprint indicates that the ambient sound in the environment of the user is extremely loud, the search area may be decreased, as there would be a larger number of users reporting the same sound from disparate locations. In particular embodiments, the social networking system first searches the fingerprints uploaded by friends of the user at the same time, based on the assumption that they are more likely to be together. In particular embodiments, spatial partitioning algorithms may be used to determine the search space. In particular embodiments, an oct-tree spatial partitioning algorithm is utilized to address the search space. In particular embodiments, a kd-tree is used. in particular embodiments, a quad-tree, or any other grid-based method, is used. This disclosure contemplates any suitable method of generating a search area for fingerprints uploaded by other users.

Figure 3A:
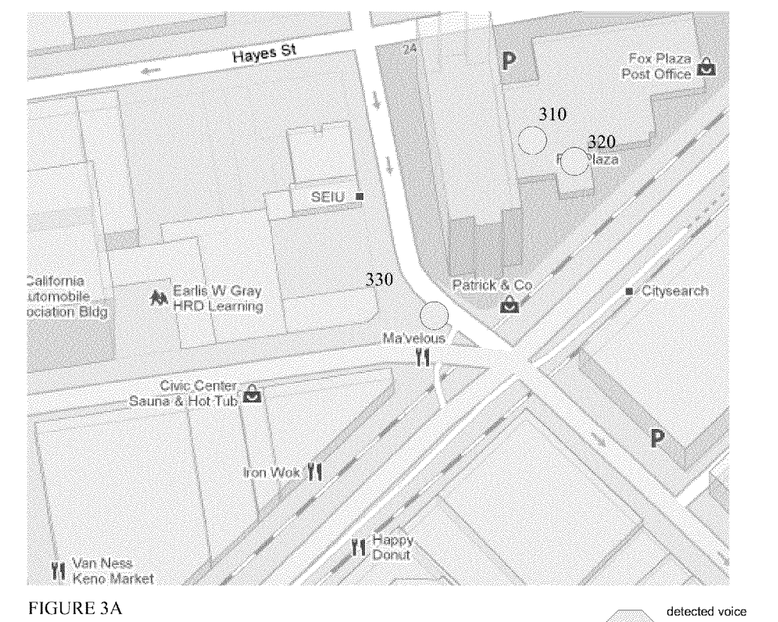
FIG. 3A illustrates an example of three users in the same geographic location.

FIG. 3A illustrates a zoomed-in view of the upper left tile of FIG. 3. In FIG. 3, three users' self-determined locations are plotted on the map. Two users, 310 and 320 report their location to be within a few meters of each other, in the Fox Plaza. Another user, 330, reports his or her location to be across the street, near the "Ma'velous" restaurant. Users 310, 320, and 300 may or may not have explicit edge connections between each other on the social graph. For the purposes of this example, the social networking system has matched the waveform fingerprints generated by all three users.

Figure 3B:
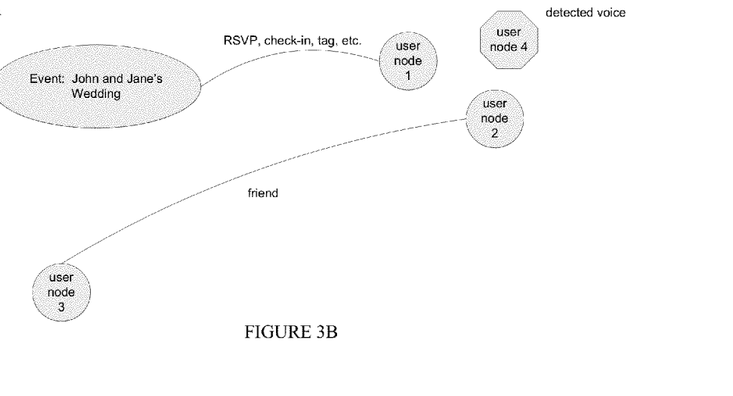
FIG. 3B illustrates the social graph for the three users of FIG. 3A.

FIG. 3B illustrates an example portion of a social graph including user 310, represented by user node 1, user 320, represented by user node 2, and user 330, represented by user node 3. Because the waveform fingerprints from all three users match, the social networking system may assume that they are in the same general vicinity. In particular embodiments, the social networking system takes into account the amplitude of all three waveform fingerprints. For example, if all three waveform fingerprints are at the same volume, and the volume is low, the social network may infer that the user location of user 330 is incorrect, and may transmit a corrected location to client device 122 of user 330. On the other hand, if all three waveform fingerprints are at the same volume, and the volume is very high, then the social network may not transmit a corrected location.

In FIG. 3B, user node 1 has performed an explicit, on-network action, such as RSVPing to an event, checking-in to a location, or being tagged in a location or event, for an event page, in this case "John and Jane's Wedding." Thus, the social network immediately knows, upon finding matching waveform fingerprints to the fingerprints transmitted by user node 1, that the users transmitting the matching fingerprints are also in the same location and attending the same event. Thus, user nodes 2 and 3 may be placed at the same location, and a corrected location may be transmitted to user node 3 (user 330 of FIG. 3A). In particular embodiments, the type of event can be used to determine whether to alter the device settings of the users. For example, given that the social network knows that user nodes 1, 2, and 3 are attending a wedding, it may transmit a command to automatically change the client device settings to "silent" or "vibrate."

In particular embodiments, the social networking system compares uploaded waveform fingerprints to fingerprints uploaded by other users in the search area, as well as audio database 105. For example, in FIG. 3B, the social network determines that user nodes 1, 2, and 3 are in the same location. It may also compare the uploaded waveform fingerprints to an audio database of the voice of every single user of the social networking system. For example, the social networking system may detect the voice of the pastor of the wedding, represented on the social networking system by user node 4. Thus, the social networking system may maintain a database of user locations for every member that is updated any time the member's voice is detected. In particular embodiments, the social networking system may even maintain a location database of users who are not members of the social network, by assigning an arbitrary placeholder user node for each detected voice. In particular embodiments, to reduce search time, the social network may search waveform fingerprints uploaded by a particular user to the audio fingerprints in audio database 105 of the voices of the particular user's friends. In particular embodiments, the social network may first search the user's friends who are currently in the same geographic quadrant as the uploading user. Thus, in particular embodiments, search time may be greatly reduced relative to searching every single stored voice fingerprint in audio database 105.

Figure 4:
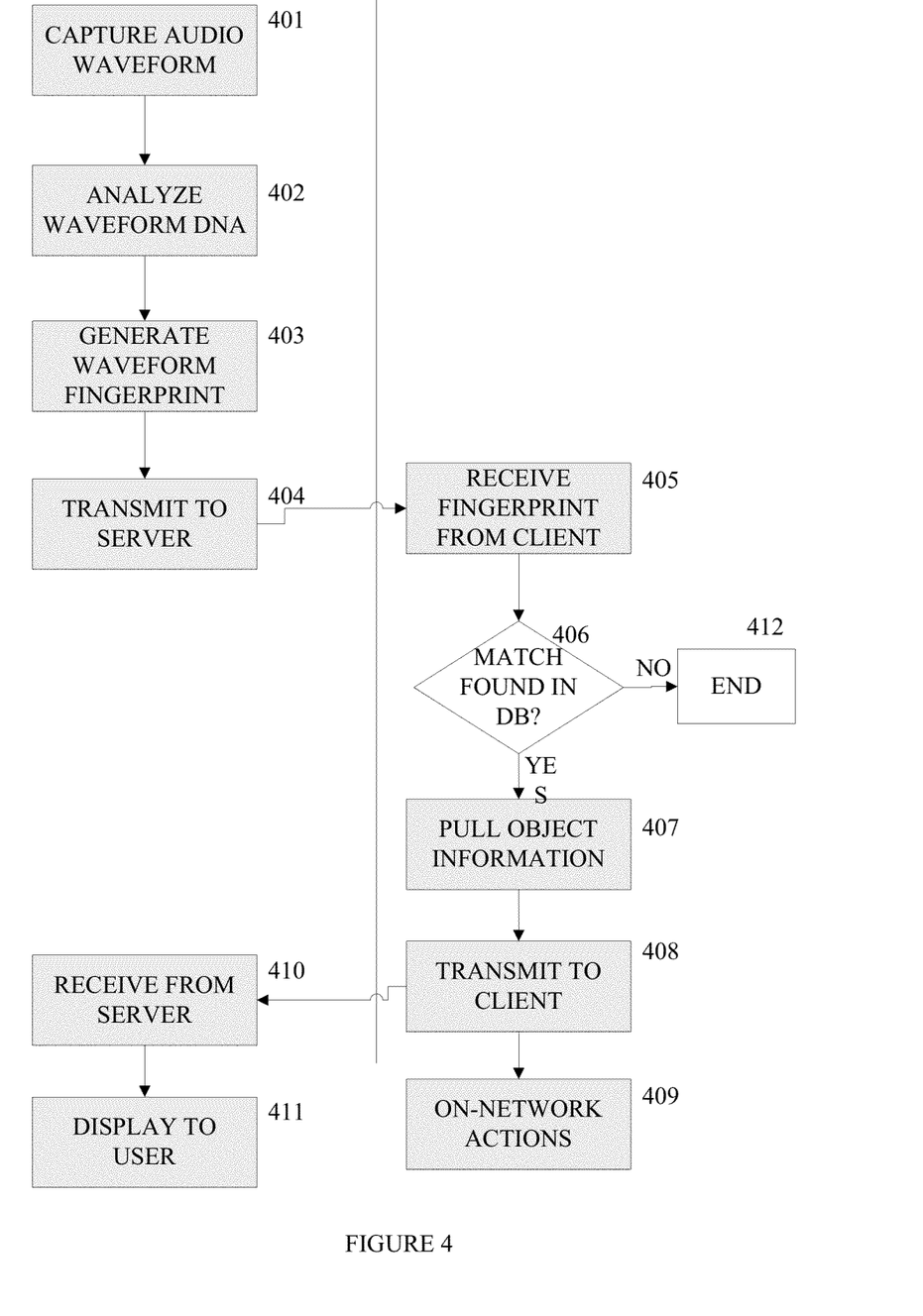
FIG. 4 illustrates an example method for delivering enhanced social functions based on captured waveform data.

FIG. 4 illustrates an example method for providing enhanced social functions based on ambient waveform capture. At step 401, microphone 245 of client device 122 records an audio waveform. As previously discussed, waveform recording may be carried out by processor 211 running audio capture application 246, or low-power processor in sensor hub 218. In particular embodiments, client device 122 constantly records the ambient audio and stores it in storage 213. In particular embodiments, client device 122 periodically records ambient audio for analysis. In particular embodiments, client device 122 records the ambient audio whenever a change in position is detected via GPS sensor 217 or other location determination algorithms. In particular embodiments, client device 122 captures the ambient audio whenever the audio exceeds a certain volume. In particular embodiments, audio capture step 301 is triggered by user interaction with the social network, such as using a social networking application, viewing the social networking website, or checking-in to a location. This disclosure contemplates any suitable manner of initiating or timing audio capture.

At Step 402, audio capture application 246 performs feature detection on the waveform and analyzes waveform characteristics, also referred to as the "waveform DNA.' Feature detection step 402 may include, in particular embodiments, identifying spikes in the audio waveform, predominance or lack of a particular frequency band, or other trends in waveform amplitude. In particular embodiments, the feature detection is implemented via an FFT or DCT. In particular embodiments, other frequency-domain transforms may be utilized to identify key characteristics of the waveform, such as how much treble or bass is present in the waveform. In particular embodiments, audio capture application 246 utilizes a discrete wavelet transform. In particular embodiments, audio capture application 246 utilizes a short-time fourier transform. In particular embodiments, audio capture application 246 detects a fundamental frequency of the waveform. In particular embodiments, audio capture application 246 filters noise components from the captured waveform. In particular embodiments, audio capture application 246 utilizes a form of event onset detection to create a beat model for the captured waveform. In particular embodiments, audio capture application 246 generates a beat histogram for the waveform. This disclosure contemplates any suitable method or algorithm for audio waveform feature detection.

At Step 403, an audio "fingerprint" is generated for one or more waveforms. The fingerprint is a small robust representation that summarizes the waveform or collection of waveforms. For example, in particular embodiments, waveforms may be captured and analyzed periodically, at one sample per second. Each waveform captured may be analyzed for feature detection, and audio capture application 246 may aggregate a number of waveforms having similar features (perhaps 100-200 waveforms) and generate a fingerprint for the aggregate waveform representing a song, video, or soundtrack to a movie. In particular embodiments, audio capture application 246 uses vector quantization to generate representative vectors as the waveform fingerprint. In particular embodiments, audio capture application 246 utilizes spectrogram peaks, such as those used in the Shazam song recognition software, as the captured waveform fingerprint. Techniques for generating waveform fingerprints are known in the art. This disclosure contemplates any suitable manner of generating fingerprints for the captured waveform or waveforms.

At Step 404, client device 122 transmits the fingerprint generated in Step 403 to a server. In particular embodiments, the server is the system front end 120 of the social networking system. In particular embodiments, client device 122 transmits the fingerprint directly to one or more servers running audio matching application 118. This disclosure contemplates any suitable mechanism of transmitting the waveform fingerprints to audio matching application 118. The one or more servers running audio matching application 118 receive the transmitted fingerprint at Step 405.

At Step 406, the received fingerprint is searched against a database of fingerprints stored in audio database 105. In particular embodiments, audio database 105 stores fingerprints of various different formats, so that fingerprints generated by a different method may still be compared to the stored fingerprints. In particular embodiments, audio database 105 stores waveforms, and the fingerprints for the stored waveforms are dynamically generated. If no matches are found, the process ends at Step 412.

If a match is found, at Step 407, information relating to the object associated with the matching fingerprint is pulled from the social networking system. In particular embodiments, this information is stored in audio database 105. In particular embodiments, the information may be stored in a separate object or node database in the social networking system. In particular embodiments, the information may be metadata attached to the waveform stored in audio database 105. The information may comprise general characteristics, such as the artist, song title, album title, date of recording, etc., and social characteristics, such as how many of the user's friends have "liked", commented on, or otherwise interacted with the object. In particular embodiments, the information may be other songs performed by the artist, or other types of music in the genre. This disclosure contemplates any type of information related to the object associated with the matching waveform fingerprint.

At Step 409, the social networking system may optionally perform on-network actions, such as automatically tagging the object in a photo, automatically "liking" the object for a user, or posting a story to the user's news feed. For example, the social networking application may have a "now playing" or "now listening/watching" area of the user profile or news feed, and update the feed with the object associated with the matching waveform. In particular embodiments, the social networking system may tag a photo of the event with a tag of the songs that were played at the event. In particular embodiments, the photo need not be uploaded by the same user who uploaded the waveform fingerprint, so long as the social network may determine that the user attended the event. This disclosure contemplates any manner of on-network actions for the user.

At Step 408, the server transmits the information to client device 122, and at Step 410, the information is received at client device 122. The client device at Step 411 may then display the information in various graphical representations to the user. For example, client device 122 may display the album art and song information to the user. In particular embodiments, client device 122 may prompt the user as to whether the user would like to purchase, download, "like", or post a review about the detected object. In particular embodiments, client device 122 may also display social information to the user, such as the number of friends who "liked" or became a fan of the artist associated with the object. In particular embodiments, client device 122 may display suggestions pushed from the social network to the user. In particular embodiments, the user may select the suggested song or artist to listen to their work. This disclosure contemplates any manner of displaying received information at client device 122 to the user.

Audio object database 105 is not limited to songs. For example, the social networking system may determine whether a particular user is watching a movie or TV program. In particular embodiments, audio object database 105 stores a fingerprint for each user of the social network's voice. Thus, it is possible to determine the location of a user speaking to the uploading user, even if the speaker does not have his or her mobile device. In such an embodiment, the social networking system may automatically tag the detected speaker into the physical location associated with the uploading user. Therefore, it is possible for the social networking system to track the physical location of its users, even those without mobile devices connected to the social network, based on voice matching.

Figure 5:
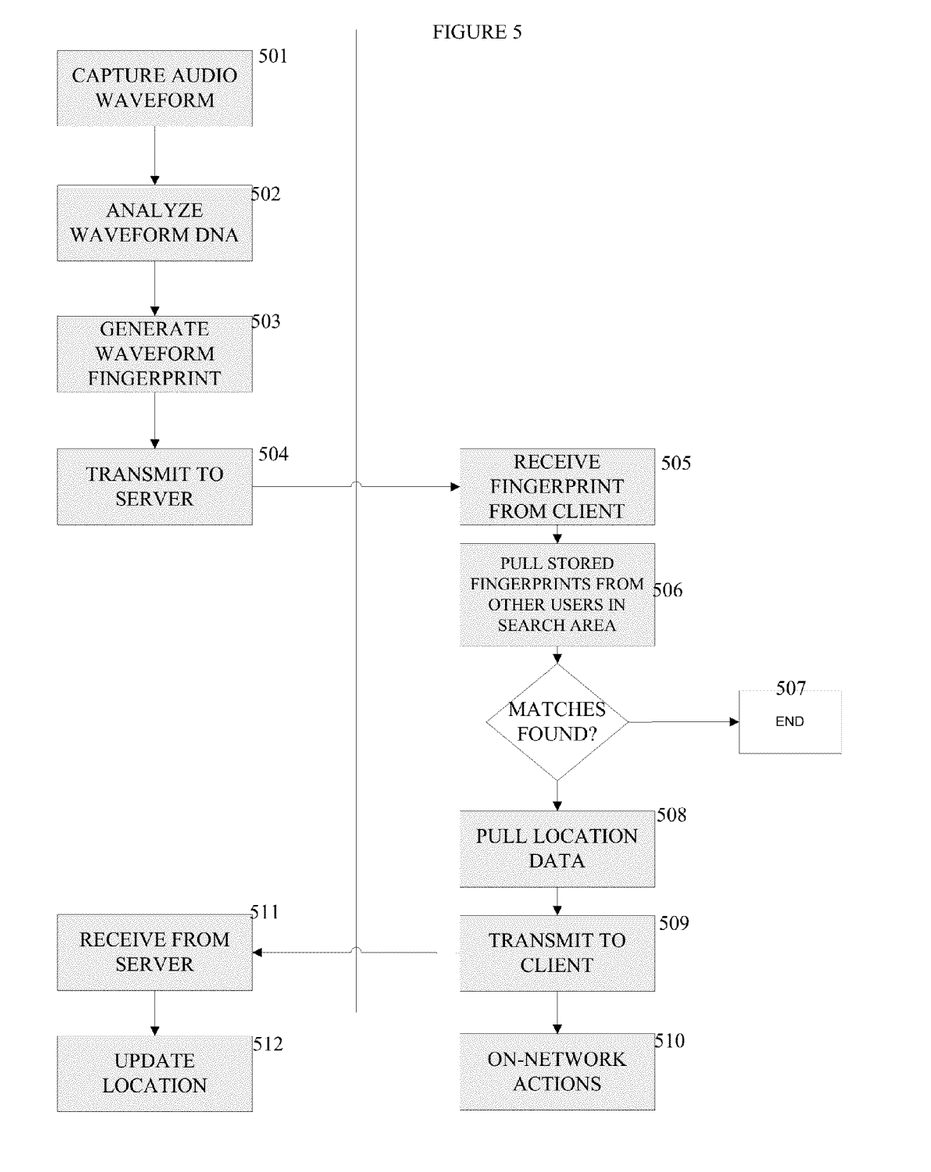
FIG. 5 illustrates an example method of enhancing location accuracy.

FIG. 5 illustrates an example method for enhancing the location determination of a user based on detected waveforms. The process is substantially identical to the process of FIG. 4 until Step 506. In particular embodiments, Steps 506-510 may be performed substantially simultaneously or in parallel with Steps 405-409.

At Step 506, audio matching algorithm 246 pulls uploaded waveforms from the same general time and area as the uploading user. The location may be ascertained through GPS coordinates, TDOA, or a self-reported location, such as a check-in. In particular embodiments, the geographic search area decreases for areas in which a large number of fingerprints are being uploaded, as previously described with reference to FIG. 3.

At Step 508, upon obtaining a matching fingerprint or fingerprints, the social networking system pulls location data associated with the one or more matching fingerprints. For example, if a particular user's uploaded fingerprints match three other users' uploaded fingerprints, and one of the three other users has checked-in to a particular location, then the location data for the check-in is pulled and transmitted to the client devices of the three users that did not check-in. In particular embodiments, the social networking system may average the geographic locations, or find the point equidistant to all the locations, of users uploading matching waveforms. For example, if three other users' uploaded audio fingerprints match the user's uploaded fingerprint, the social networking system may calculate a point equidistant to the three other users' locations. In particular embodiments, the social networking system searches for position outliers, for example if three of the four users with matching uploaded fingerprints are extremely close, and one is several hundred feet away, the social networking system may infer that the location of the outlier user is inaccurate.

At Step 510, the network may perform actions as previously described. In particular embodiments, the social networking system may check the uploading user in to the location obtained in Step 508.

At Step 512, after receiving the location information from the server in Step 511 client device 122 updates its self-determined location with the location obtained in Step 508. In some cases, it may be to the location of a physical check-in. In particular embodiments, it is updated to comport with the location of other uses with matching waveforms. In particular embodiments, client device 122 prompts the user as to whether he wishes to check-in to the venue. In particular embodiments, client device 122 prompts the user whether he wishes to update his location. This disclosure contemplates any suitable manner of updating the self-determined position of client device 122.

Figure 6:
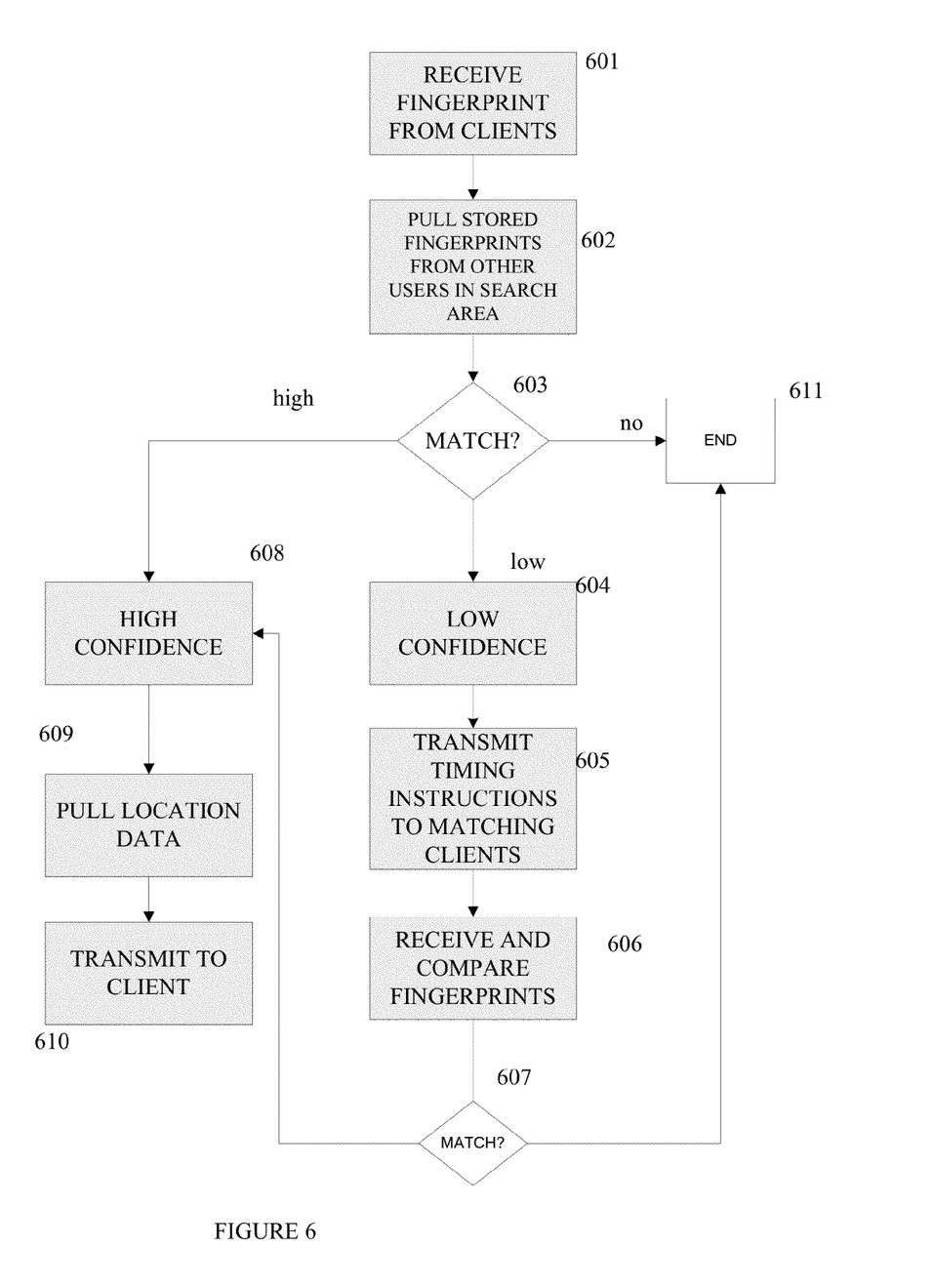
FIG. 6 illustrates an example method of providing an enhanced social function.

FIG. 6 illustrates an example method of obtaining a higher confidence match between one or more client devices. Steps 601 to 603 are identical to Steps 505-506 of FIG. 5. Similarly, Steps 608-610 are identical to Steps 508 to 509. In particular embodiments, waveform matching application 118 may only obtain a partial, or "low confidence" match. In particular embodiments, the confidence level is merely a percentage of the fingerprints that are matching. In particular embodiments, the confidence score is based off the degree the fingerprints match as well as location data of the uploading users. For example, if the users fingerprints are matching, but their locations are several miles apart, the process of Step 604 is not initiated. In particular embodiments, social factors are utilized in determining the confidence of a match. For example, where two waveform fingerprints partially match, but the two uploading users are friends in roughly the same location, then Step 604 is initiated. This disclosure contemplates any suitable method of determining whether a match is high or low confidence.

At Step 605, the server transmits instructions to all clients whose uploaded fingerprints produced the low confidence match to begin capturing ambient audio data at a specific time and duration. In particular embodiments, this instruction may also instruct the client devices to perform fingerprint analysis via an alternative method. In particular embodiments, the alternative method is determined by the degree of confidence of the match. In particular embodiments, the alternative method is determined by the percent of the uploaded fingerprints that match. In particular embodiments, this instruction may inform the clients to capture audio at a higher quality. The client devices 122 receiving this instruction comply, and transmit the subsequently generated waveforms to the server.

In Step 606, the server and waveform matching application 118 receive the fingerprints, and compares them in Step 607. Because the fingerprints capture the exact same moment in time, the fingerprints generated from these waveforms should produce an extremely high confidence match. Thus, waveform matching application 118 can ascertain, with a high degree of confidence, that the uploading users are in the same location. In particular embodiments, this high-confidence match can be matched with the fingerprints of user voices in audio database 105 to determine which of the users is speaking In particular embodiments, the users may be all auto-tagged in the location. In particular embodiments, the users may not be explicitly tagged, but stored in a user location database for the delivery of advertisements or suggestions.

The process of FIG. 6 thus allows the social network to increase the confidence of any two partially matching fingerprints, by coordinating waveform capture to the same temporal window. This disclosure contemplates multiple variations of this technique, such as, for example, multiple stages of fingerprint matching, wherein each stage instructs the client devices to capture a longer waveform.

Figure 7:
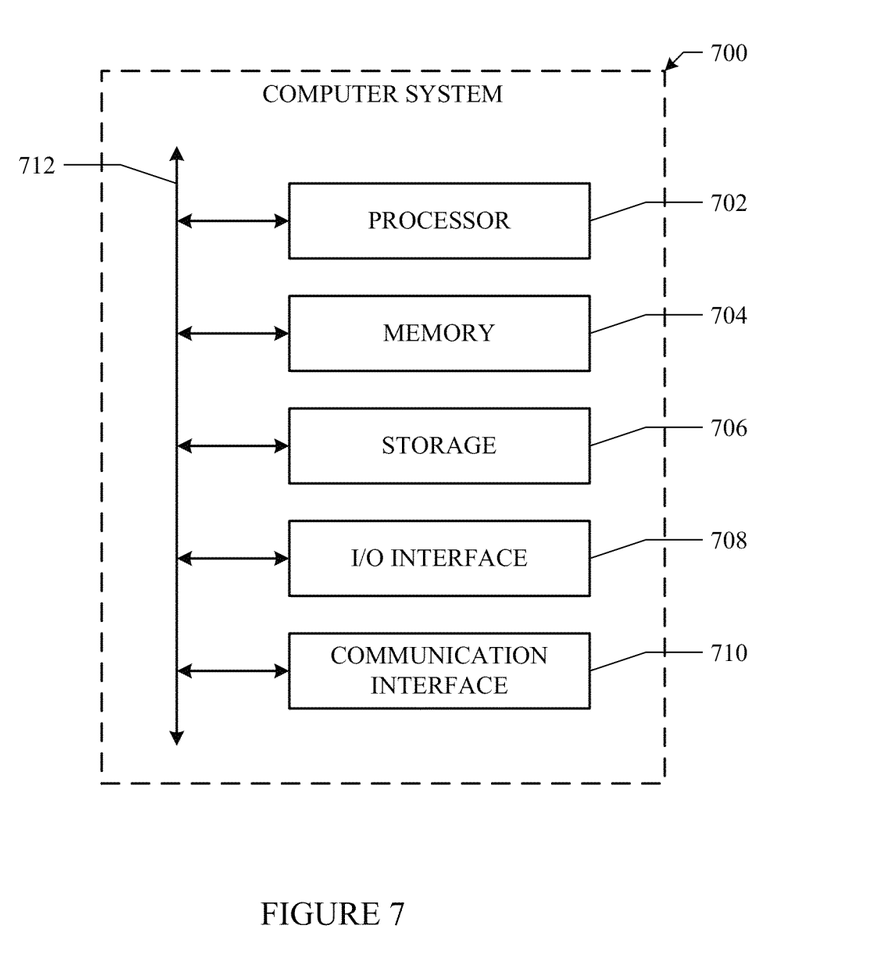
FIG. 7 illustrates an example computer system.

Particular embodiments may be implemented on one or more computer systems. FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate onOne or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
   capturing audio data from a sensor of a client device;
   performing waveform analysis on the audio data;
   generating a fingerprint for the audio data;
   sending the fingerprint and a self-determined location of the client device to a server;
   receiving, from the server, location information associated with the location of the client device, wherein the location information is determined by:
      comparing the fingerprint to a database of stored audio waveform fingerprints comprising uploaded audio waveform fingerprints from one or more client devices;
      finding one or more matching audio waveform fingerprints from a comparison set of audio waveform fingerprints obtained from the database, the comparison set determined based at least in part on the self-determined location of the client device; and
      determining, based at least in part on the matching audio waveform fingerprints, the location information associated with the location of the client device; and
   updating the self-determined location of the client device based at least in part on the received location information.

2. The method of claim 1, further comprising:
   receiving, from the server, information relating to content of the audio data; and
   displaying the received information to a user of the client device.

3. The method of claim 2, wherein the information is a name, artist, album, or image relating to a song detected in the audio data.

4. The method of claim 1, further comprising:
   receiving an instruction from the server, the instruction comprising at least a specific time to begin capturing audio data and a capture duration; and
   capturing audio data in accordance with the received instruction.

5. The method of claim 4, further comprising:
   receiving, from the server, information relating to content of the audio data; and
   displaying the received information to a user of the client device.

6. A method, by one or more computing systems, comprising:
   receiving an audio waveform fingerprint and a client-determined location from a client device;
   comparing the received audio waveform fingerprint to a database of stored audio waveform fingerprints, each stored audio waveform fingerprint associated with an object in an object database;
   finding one or more matching audio waveform fingerprints from a comparison set of audio waveform fingerprints obtained from the audio waveform fingerprint database;
   determining, based at least in part on the matching audio waveform fingerprints, location information associated with a location of the client device; and
   sending the location information to the client device, wherein the client device is operable to update the client-determined location based at least in part on the location information;
   wherein the database of stored audio waveform fingerprints comprises uploaded audio waveform fingerprints from one or more other client devices; and
   the comparison set of audio waveform fingerprints is determined based at least in part on the received client-determined location.

7. The method of claim 6, further comprising:
   sending content from an object associated with one or more of the matching audio waveform fingerprints to the client device.

8. The method of claim 7, wherein the objects is a song and the content from the song comprises information about the song.

9. The method of claim 6, wherein the one or more other client devices are associated with one or more users of a social-networking system.

10. The method of claim 9, wherein the matching audio waveform fingerprints comprise uploaded audio waveform fingerprints from one or more of the users.

11. The method of claim 10, wherein the location information is determined based at least in part on information associated with the one or more of the users in the social-networking system.

12. The method of claim 9, wherein the objects comprise voices of one or more of the users.

13. The method of claim 9, wherein the comparison set of audio waveform fingerprints from the audio waveform fingerprint database is based at least in part on social factors between a user of the client device and one or more of the users of the social-networking system.

14. A method, by one or more computing systems, comprising:
   receiving a first waveform fingerprint and a client-determined location from a first client device;
   comparing the received first waveform fingerprints to a database of stored waveform fingerprints, each stored waveform fingerprint being uploaded from one of a plurality of second client devices;

finding one or more matching waveform fingerprints from the waveform fingerprint database;

classifying each match as a high-confidence or low-confidence match; and for each high-confidence match:
- determining, based at least in part on the matching waveform fingerprints, location information associated with a location of the first client device; and
- sending the location information to the first client device, wherein the first client device is operable to update the client-determined location based at least in part on the location information;

for each low confidence match, sending an instruction to the first client device and the one or more second client devices whose uploaded waveform fingerprints match the received first waveform fingerprint to capture audio data at a particular time and for a particular duration.

15. The method of claim 14, further comprising:

receiving in response to the instruction a plurality of second audio waveform fingerprints from the first client device and the one or more second client devices;

determining whether the received second audio waveform fingerprint from the first client device matches any of the one or more received second audio waveform fingerprints from the one or more second client devices; and in response to a positive determination, determining that the first client device is in the same location as the second client devices whose received second audio waveform fingerprints match the received second audio waveform fingerprint from the first client device.

16. The method of claim 15, further comprising:

in response to a positive determination, determining that the first client device and the second client devices whose received second audio waveform fingerprints match the received second audio waveform fingerprint from the first client device are in the same location as a particular user whose voice is associated with the matching received second audio waveform fingerprints; and storing the location of the particular user.

17. The method of claim 16, further comprising automatically tagging the particular user at the location.

18. The method of claim 14, wherein the comparison set of audio waveform fingerprints from the audio waveform fingerprint database is based at least in part on social factors between a user of the first client device and one or more users of the second client devices.

* * * * *